(12) United States Patent
Zlotos

(10) Patent No.: US 6,588,988 B2
(45) Date of Patent: Jul. 8, 2003

(54) APPARATUS FOR CONVEYING BULK MATERIAL WITH VACUUM-RESPONSIVE CONTROLLED INTRODUCTION OF A CONVEYING GAS

(75) Inventor: Michael Zlotos, Lauffen (DE)

(73) Assignee: Mann & Hummel ProTec GmbH, Ludwigsburg (DE)

( * ) Notice: Subject to any disclaimer, the term of this patent is extended or adjusted under 35 U.S.C. 154(b) by 0 days.

(21) Appl. No.: 09/927,410

(22) Filed: Aug. 13, 2001

(65) Prior Publication Data
US 2002/0061232 A1 May 23, 2002

(30) Foreign Application Priority Data
Aug. 12, 2000 (DE) .......................... 100 39 564

(51) Int. Cl.⁷ .............................. B65G 51/16
(52) U.S. Cl. ...................... 406/14; 406/30; 406/141; 406/151
(58) Field of Search ................ 406/14, 30, 93, 406/94, 116, 141, 151, 197, 153

(56) References Cited

U.S. PATENT DOCUMENTS

| | | | | |
|---|---|---|---|---|
| 2,774,636 A | * | 12/1956 | Whitlock | 406/115 |
| 4,607,987 A | * | 8/1986 | Kice | 239/76 |
| 4,685,476 A | * | 8/1987 | Hagemann et al. | 131/108 |
| 5,037,246 A | * | 8/1991 | Okano et al. | 406/152 |
| 5,064,314 A | * | 11/1991 | Grooms et al. | 406/22 |
| 5,201,877 A | * | 4/1993 | Relin et al. | 15/404 |
| 5,252,007 A | * | 10/1993 | Klinzing et al. | 406/14 |
| 5,593,252 A | * | 1/1997 | Relin et al. | 15/404 |
| 5,615,701 A | * | 4/1997 | Yamabe et al. | 137/205 |
| 5,749,684 A | * | 5/1998 | Horn Feja | 406/141 |
| 5,865,568 A | * | 2/1999 | Relin et al. | 406/85 |
| 6,036,407 A | * | 3/2000 | Nester | 406/109 |

FOREIGN PATENT DOCUMENTS

DE 298 15 537 12/1998

* cited by examiner

Primary Examiner—Joseph A. Dillon
(74) Attorney, Agent, or Firm—Crowell & Moring LLP

(57) ABSTRACT

An apparatus for conveying bulk material in which a variable amount of a conveying gas may be introduced to the bulk material to be conveyed by a negative pressure of a vacuum conveying system. In a conveying line (4) for the bulk material being transported by the vacuum conveying system while adding the conveying gas, the negative pressure is measured by a pressure sensor (7), and a corresponding control signal is output. In a conveying gas inlet (3) of the vacuum conveying system, a valve (9) is installed whose opening for the flowing conveying gas is controlled by a controller (8) as a function of the magnitude of the negative pressure within the conveying line (4).

13 Claims, 1 Drawing Sheet

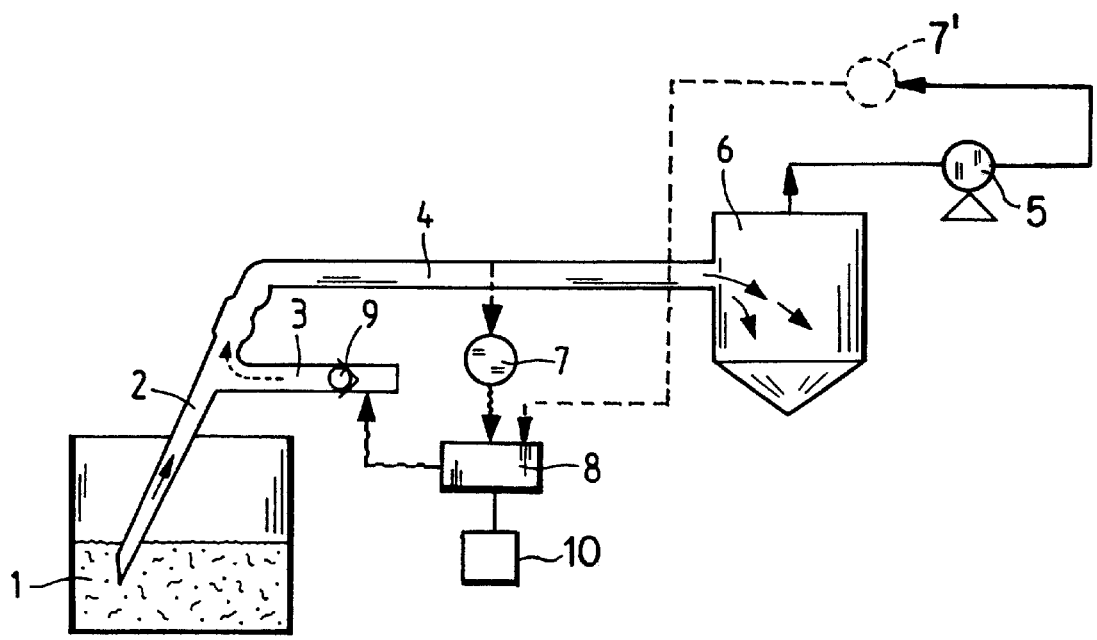

APPARATUS FOR CONVEYING BULK MATERIAL WITH VACUUM-RESPONSIVE CONTROLLED INTRODUCTION OF A CONVEYING GAS

BACKGROUND OF THE INVENTION

The invention relates to an apparatus for conveying bulk material in which a conveying gas can be added to bulk material conveyed through a conveying line by a negative pressure of a vacuum conveying system, and to a method of conveying bulk material in which a conveying gas is introduced to the bulk material as the material is conveyed by a vacuum conveying system.

Bulk material is typically conveyed in a vacuum conveying system with suction tubes or a suction box. In various embodiments, for instance, plastic granulates or other flowable material, are transported by suction in the form of bulk material or material to be conveyed. To provide an optimal charge as a function of the vacuum conveying system, different amounts of conveying gas are added to the material to be conveyed, for instance by manually shifting a lance within a double shell or by manually adjusting the gas supply.

A vacuum conveying system of this type is known, for example, from German Utility Model No. DE 298 15 537 U1. This document discloses an apparatus in which the conveying gas or the conveying air is supplied via a rotatable adjusting sleeve. The adjusting sleeve is actuated by a driving device with a remote controlled driving motor. These devices are used in individual conveying apparatuses as well as in more complex conveying systems. In practice, it frequently occurs that due to the wide variety of operating conditions the introduction of conveying air is not optimally adjusted and there are malfunctions in the process.

SUMMARY OF THE INVENTION

It is the object of the invention to provide an apparatus for conveying bulk material in which optimal introduction of a conveying gas can be achieved.

Another object of the invention is to provide a apparatus for conveying bulk material which can automatically adjust to a wide variety of operating conditions.

It is also an object of the invention to provide an improved method of conveying bulk material through a conveying line by a negative pressure of a vacuum conveying system.

These and other objects of the invention are achieved by providing an apparatus for conveying bulk material in which a conveying gas is introduced through an inlet to bulk material conveyed through a conveying line by a negative pressure of a vacuum conveying system, further comprising a pressure sensor for measuring the negative pressure in the conveying line, and a valve responsive to the measured pressure for regulating the introduction of the conveying gas through the inlet.

In accordance with a further object of the invention, the objects are achieved by providing a method of conveying bulk material comprising the steps of conveying bulk material through a conveying line by a negative pressure of a vacuum conveying system; introducing a conveying gas through an inlet into the conveyed bulk material; sensing the negative pressure in the conveying line, and regulating the introduction of conveying gas through the inlet into the bulk material in response to the sensed pressure to maintain the negative pressure in the conveying line within a target pressure range for conveying the bulk material.

The apparatus of the invention comprises a vacuum conveying system in which a variable amount of a conveying gas can be added to the bulk material to be transported in response to the negative pressure measured in the conveying line through which the bulk material is conveyed. In the method of the invention, the negative pressure in the bulk material conveying line is measured, and the introduction of conveying gas is controlled by a valve in response to the magnitude of the measured negative pressure to maintain the pressure at an optimum value or within an optimum range. This apparatus and method are advantageously suitable to attain the foregoing objects.

Thus, according to the invention, the negative pressure that is present in a bulk material conveying line due to the vacuum transport process is measured by a pressure sensor and a corresponding control signal is output. This makes it possible advantageously to control a valve to regulate the introduction of conveying gas through a conveying gas inlet, so that the valve opening for the flowing conveying gas can be adjusted as a function of the magnitude of the negative pressure within the conveying line.

In preferred embodiments, the valve can be actuated either pneumatically or electrically. It is further advantageous if according to one embodiment, the vacuum conveying system is equipped with a telescopic suction tube to which the inlet device for the conveying gas with the valve is connected. In another embodiment, the vacuum conveying system comprises a suction box to which the inlet device for the conveying gas with the valve is connected.

It is also advantageous if the control arrangement for controlling the valve opening as a function of the pressure measurement comprises an alarm device. If the pressure value deviates from a predefined range, the alarm device generates an alarm signal indicating an insufficient charging condition and thus a disturbance in the conveying capacity.

Furthermore, the control arrangement for controlling the valve opening may be used in a simple manner to generate a control signal to open the valve, by which, in deviation from controlling the conveyance of the bulk material, the conveying line can be sucked empty without any additional components.

As an alternative to the arrangement of the pressure sensor in the conveying line, the pressure sensor may also be disposed in the clean gas line or line between the bulk material container and the vacuum system, since the negative pressure can propagate from the conveying line all the way to the clean gas line. In this case, too, the signals of the pressure sensor are forwarded to the control arrangement, which controls the valve accordingly. It is of course also possible to use a sensor in the vacuum system, for instance a current sensor, to form an electrical signal, which is proportional to the negative pressure. This signal also can be used to control the valve.

These and other features of preferred embodiments of the invention, in addition to being set forth in the claims, are also disclosed in the specification and/or in the drawings, and the individual features each may be implemented in embodiments of the invention either individually or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to an illustrative preferred embodiment shown in the accompanying drawing FIGURE which schematically depicts an example of an apparatus according to the invention for conveying bulk material.

DETAILED DESCRIPTION OF PREFERRED EMBODIMENT

The drawing FIGURE shows a bulk good storage vessel 1 in a vacuum conveying system, which is intended for conveying a bulk material, such as a plastic granulate. With a suction tube 2, the bulk material is transported into a conveying line 4 while conveying air is added via a conveying air inlet 3. From the conveying line the bulk material passes into a bulk material vessel 6. The negative suction pressure is produced by a suction device 5, e.g., a vacuum pump.

The negative pressure created through suction in conveying line 4 is measured by a pressure measuring device 7 which communicates directly with conveying line 4, and a corresponding pressure signal is transmitted to a control arrangement 8. Alternatively, the negative pressure in conveying line 4 can be indirectly sensed by a pressure sensor 7' which communicates with a vacuum line connected between the bulk material receiving vessel 6 and the vacuum source 5 of the vacuum conveying system.

In control arrangement 8, a control signal is generated as a function of the measured pressure value. The control signal, in turn, is used to control a valve 9 which regulates the addition of conveying air through conveying air inlet 3. Valve 9 can be operated by conventional means, e.g., pneumatically or electrically. When the negative pressure in the conveying line 4 exceeds a certain amount, the conveying air supply may be increased by opening valve 9. If the negative pressure is too low, the conveying air may be correspondingly reduced.

The apparatus of the invention also may optionally include an alarm 10 which generates an alarm signal if the pressure sensed by the pressure sensor 7 or 7' deviates from a target pressure range thereby alerting an operator that the conveying conditions have varied from desired optimum values.

The foregoing description and examples have been set forth merely to illustrate the invention and are not intended to be limiting. Since modifications of the disclosed embodiments incorporating the spirit and substance of the invention may occur to persons skilled in the art, the invention should be construed broadly to include all variations falling within the scope of the appended claims and equivalents thereof.

What is claimed is:

1. An apparatus that conveys bulk material, comprising a conveying line, a vacuum pump for drawing a negative pressure in the conveying line, a conveyor gas inlet for introducing a conveying gas into the conveying line, a pressure sensor that measures the negative pressure in said conveying line, a valve responsive to the measured pressure for regulating the introduction of the conveying gas through said conveyor gas inlet, and a controller for controlling the valve based on a pressure signal from the pressure sensor.

2. An apparatus according to claim 1, wherein said pressure sensor is disposed in said conveying line.

3. An apparatus according to claim 1, wherein said pressure sensor is disposed in a vacuum line connected between a receiving vessel for the conveyed bulk material and a vacuum source of the vacuum conveying system.

4. An apparatus according to claim 1, wherein said valve is a pneumatically actuated valve.

5. An apparatus according to claim 1, wherein said valve is an electrically actuated valve.

6. An apparatus according to claim 1, wherein said vacuum conveying system comprises a telescopic suction tube, and the inlet for the conveying gas communicates with said suction tube.

7. An apparatus according to claim 1, wherein the vacuum conveying system comprises a suction box, and the inlet for the conveying gas communicates with said suction box.

8. An apparatus according to claim 1, further comprising an alarm which generates an alarm signal if the pressure sensed by the pressure sensor deviates from a target pressure range.

9. An apparatus according to claim 1, wherein said pressure sensor emits a pressure signal which is transmitted to a controller, and said controller in turn produces a valve control signal which is transmitted to said valve.

10. An apparatus according to claim 9, wherein the controller includes a conveying line emptying arrangement which can be actuated to override the pressure responsive control of the valve and open the valve so that the conveying line can be sucked empty.

11. A method of conveying bulk material comprising the steps of conveying bulk material through a conveying line by a negative pressure of a vacuum pump; introducing a conveying gas through an inlet into the conveyed bulk material; sensing the negative pressure in said conveying line using a pressure sensor disposed in said conveying line, and regulating the introduction of conveying gas through said inlet into the bulk material in response to the sensed pressure to maintain the negative pressure in the conveying line within a target pressure range for conveying the bulk material.

12. A method according to claim 11, wherein the pressure is sensed by a pressure sensor disposed in a vacuum line connected between a receiving vessel for the conveyed bulk material and a vacuum source of the vacuum conveying system.

13. A method according to claim 11, wherein the pressure is sensed by a pressure sensor which emits a pressure signal which is transmitted to a controller, and the controller in turn produces a valve control signal which is transmitted to a valve which regulates the introduction of conveying air into the conveyed bulk material.

* * * * *